Sept. 25, 1934.   R. E. RUTLEDGE   1,974,898
PIE DISH OR PACKAGE
Filed April 30, 1934
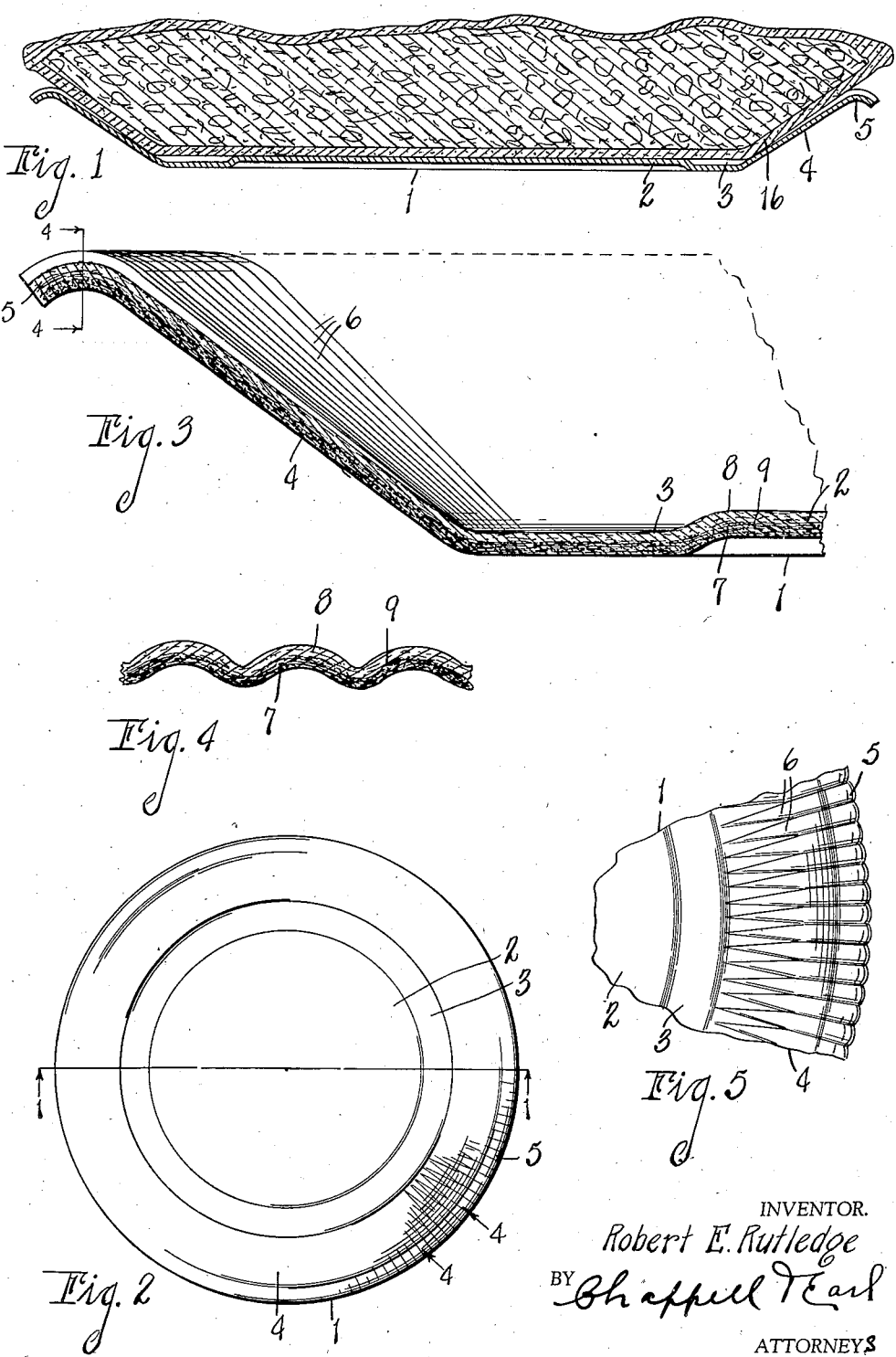
INVENTOR.
Robert E. Rutledge
BY
ATTORNEYS Patented Sept. 25, 1934

1,974,898

UNITED STATES PATENT OFFICE 1,974,898

PIE DISH OR PACKAGE

Robert E. Rutledge, Kalamazoo, Mich., assignor to Sutherland Paper Company, Kalamazoo, Mich.

Application April 30, 1934, Serial No. 723,120

7 Claims. (Cl. 229—2.5)

The main objects of this invention are:

First, to provide a merchandising pie dish or package which is well adapted for the reception of baked goods and the like while hot from the oven and retains its attractive appearance.

Second, to provide a pressed paper container of this character conformed to efficiently ventilate the baked goods and to protect the same from the moisture of condensation formed between the goods and the container.

Third, to provide a package for baked goods and the like having the above desirable features and characteristics and which is simple and economical in construction and very efficient and effective for the purpose intended.

Objects relating to details and economies of my invention will appear from the description to follow. The invention is defined and pointed out in the claims.

A structure which is a preferred embodiment of my invention is illustrated in the accompanying drawing, in which:

Fig. 1 is an enlarged transverse section of a pressed paper container embodying the features of my invention, taken on a line corresponding to line 1—1 of Fig. 2, the baked goods, a pie, being shown in section.

Fig. 2 is a top plan view of my improved container.

Fig. 3 is an enlarged fragmentary transverse section of my container, the thickness of the stock being exaggerated.

Fig. 4 is an enlarged fragmentary detail section taken on a line corresponding to line 4—4 of Figs. 2 and 3.

Fig. 5 is an enlarged fragmentary top plan view.

Referring to the drawing, the illustrated embodiment of my invention comprises a pressed paper container 1 in the form of a pie plate or dish having an elevated central bottom portion 2 providing a continuous annular channel 3 between such portion and the sloping wall 4 of the container. The wall terminates in an arched rim 5, the rim being arched to strengthen the structure.

The wall of the container is corrugated to provide radial flutes 6 extending from the channel 3 to the rim 5 of the container. These flutes coact with the channel to ventilate the body 16 of hot baked goods placed in the container to cool and for merchandising. In the illustrated embodiment, the body of hot baked goods is a pie as shown.

My container is formed of stock having an outer hard sized or moisture-resisting layer or stratum 7 and a soft inner unsized or moisture-absorbing layer or stratum 8. The container is formed of stock, one side of which has this water-resisting quality and the other the water or moisture-absorbing quality, there being preferably several strata or layers of increasing hardness or water-resisting qualities from the inside out, the intermediate strata being indicated at 9. This formation of the paper may be accomplished in the paper-making machine by arranging the forming cylinders in tandem so that the pulp from the different cylinders is deposited in succession as superimposed layers on the same felt, and by regulating the amount of sizing in the successive tanks or cylinder vats, the character of the product may be very effectively controlled so that the desired stock is secured with the moisture-absorbing inner surface and a moisture-resisting outer surface, as stated.

It is customary for bakers to turn out baked goods from the sheet metal pans used in baking to cool in the packages or containers in which the baked goods are to be sold. In the past, this has resulted in a certain amount of the moisture of condensation between the container and the goods being soaked up by the goods owing to the moisture resisting properties of the container. This undesirable feature has been present especially in pies where the latter have been turned out of the baking tins directly into pressed paper pie plates.

In the past, the pressed paper pie plates have been made of hard sized layers throughout or with a hard sized inner layer which comes in contact with the pie. Thus, in the past, the moisture of condensation was taken up by the bottom crust of the pie to the damage of the latter. By providing an unsized or absorbent inner stratum for contact with the baked goods, I provide means for protecting the latter from the moisture of condensation formed at the point of contact of the baked goods therewith. The unsized or absorbent inner stratum of paper absorbs or blots up the moisture of condensation, leaving the bottom of the pie dry. The hard sized outer stratum of paper acts to prevent such moisture from permeating through the container and weakening the latter and/or injuring its appearance. It is thus seen that my container not only protects the baked goods from moisture, but holds its shape and is structurally strong even though a considerable quantity of moisture is absorbed by the inner layers or strata, and the package retains its attractive appearance.

I have illustrated and described my improvements in an embodiment which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent, is:

1. A package for baked goods and the like comprising a pressed paper container in the form of a plate or dish having an elevated central bottom portion providing an annular channel between such portion and the sloping wall of the container, the wall having corrugations forming radial flutes extending from said channel to the rim of the container, the rim being arched to strengthen the structure, said channel and flutes acting to ventilate a body of hot baked goods placed in the container to cool, and the paper of the container having a hard sized stratum at its outer surface and a substantially unsized stratum at its inner surface, the degree of sizing increasing from the unsized inner stratum to the hard sized outer stratum, whereby the moisture of condensation formed at the point of contact of the body of baked goods with the container is absorbed by the unsized inner stratum, the hard sized outer stratum acting to prevent such moisture from permeating the container.

2. A package for baked goods and the like comprising a pressed paper container in the form of a plate or dish, the paper of the container having a hard sized stratum at its outer surface and a substantially unsized stratum at its inner surface, the degree of sizing increasing from the unsized inner stratum to the hard sized outer stratum, whereby the moisture of condensation formed at the point of contact of the body of the baked goods with the container is absorbed by the unsized inner stratum, the hard sized outer stratum acting to prevent such moisture from permeating the container.

3. A package for baked goods and the like comprising a pressed paper container, the paper of the container having a hard sized stratum at its outer surface and a substantially unsized stratum at its inner surface, whereby the moisture of condensation formed at the point of contact of the body of baked goods with the container is absorbed by the unsized inner stratum, the hard sized outer stratum acting to prevent such moisture from permeating the container.

4. A package for receiving hot baked goods for cooling, comprising paper having a hard sized stratum at its outer surface and a substantially unsized stratum at its inner surface, the degree of sizing increasing from the unsized inner stratum to the hard sized outer stratum through intermediate strata, whereby the moisture of condensation formed at the point of contact of the body of baked goods with the container is absorbed by the unsized inner stratum, the hard sized outer stratum acting to prevent such moisture from permeating the paper.

5. A package for baked goods and the like comprising a pressed paper container in the form of a plate or dish having a substantially unsized stratum on its inner side whereby the moisture of condensation resulting from the cooling of baked goods placed therein while hot is absorbed, the container having an outer hard-sized moisture-resisting stratum.

6. A package for baked goods and the like comprising a pressed paper container in the form of a plate or dish having an outer moisture-resisting stratum and an inner moisture-absorbing stratum whereby the moisture condensation resulting from the cooling of baked goods placed therein while hot is absorbed by the inner stratum and penetration to the outside minimized.

7. A package for baked goods and the like comprising a paper container having an outer moisture resisting stratum and an inner moisture absorbing stratum whereby the moisture resulting from the baked goods placed therein is absorbed by the inner stratum and penetration to the outside minimized.

ROBERT E. RUTLEDGE.